Figure 1:
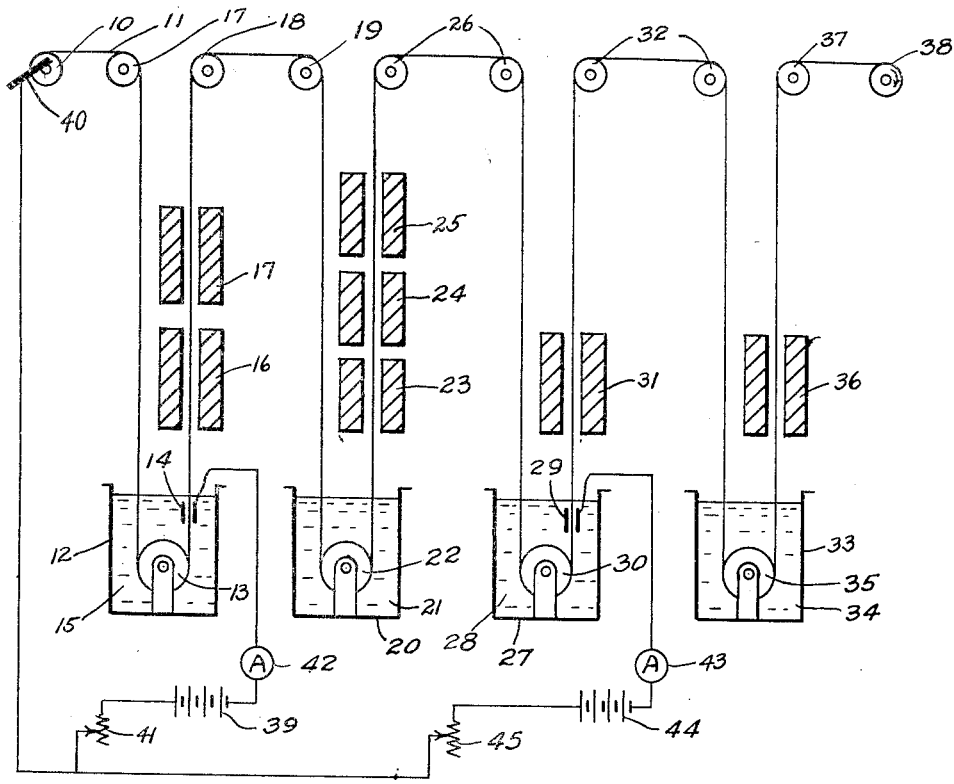

May 3, 1955

S. O. DORST 2,707,703

HEAT STABLE, INSULATED, ELECTRICAL CONDUCTORS
AND PROCESS FOR PRODUCING SAME

Filed Aug. 9, 1947

2 Sheets-Sheet 1

STANLEY O. DORST
INVENTOR.

BY
his Attorney

United States Patent Office 2,707,703
Patented May 3, 1955

2,707,703

HEAT STABLE, INSULATED, ELECTRICAL CONDUCTORS AND PROCESS FOR PRODUCING SAME

Stanley O. Dorst, North Adams, Mass., assignor to Sprague Electric Company, North Adams, Mass., a corporation of Massachusetts Application August 9, 1947, Serial No. 767,740

29 Claims. (Cl. 204—28)

This invention relates to improved electrical conductors and more particularly refers to insulated electrical conductors which may be operated at temperatures up to about 325° C. The present application is a continuation-in-part of copending application Serial Number 536,448, filed May 20, 1944, now Patent No. 2,495,630, granted January 24, 1950.

Flexible, insulated conductors, such as wire, have been used for many years in transformers, coils, motors and the like. Most of the flexible insulation used or proposed for use on such conductors has been organic in nature and therefore incapable of withstanding temperatures much in excess of 100° C. For purposes in which high temperatures may be encountered, there are three types of flexible insulation presently being applied to conductors. The first of these is asbestos, in its natural, fibrous form. This insulation is stable to very high temperatures, but possesses the disadvantages of a very large minimum thickness that can be successfully employed on the conductor, and of poor physical and electrical properties. It is not particularly resistant to abrasion nor to permeability of moisture. The second type is glass fibre which may be wound or woven about wire by the methods used for cotton, silk and rayon insulations. Here again, the minimum thickness of insulation is quite high, and it is impossible to produce insulation of a thickness less than about 10 mils. The glass fibre insulated conductors are pervious to moisture, and the abrasion resistance of the insulation is low. Third and most satisfactory type is produced by the electrophoretic deposition of ceramic particles followed by impregnation with a resin to increase the abrasion resistance, flexibility and toughness of the coating. The insulating layers so formed have been, to be sure, thin and fairly flexible. However, their resistance to abrasion has left much to be desired, and the resins applied have not been stable to temperatures much in excess of 200° C. For applications requiring a minimum insulation thickness for operation at temperatures in excess of 200° C., there has been no satisfactory insulation available.

It is an object of this invention to provide a flexible, heat resistant insulation that is free of the foregoing and related disadvantages. It is a further object to produce insulated electrical conductors which may be operated at temperatures up to about 325° C. without failure of the insulation. A still further object is to produce very thin, moisture-impervious, flexible insulating layers on all types of electrical conductors. An additional object is to produce improved electrical elements and assemblies utilizing the insulating conductors of the invention. Additional objects will become apparent from a consideration of the following description and claims.

These objects are attained in accordance with the invention wherein there is produced an electrical conductor provided with an insulating layer containing both refractory particles and a resin selected from the class consisting of polymers and copolymers of tetrafluoroethylene. In a more restricted sense this invention is concerned with an electrical conductor insulated with a thin layer of refractory ceramic particles and an integral coating of fused polytetrafluoroethylene particles. In one of its specific embodiments the invention is concerned with an insulated electrical conductor comprising an electrical conductor bearing a semi-porous layer of electrophoretically deposited, refractory ceramic particles, the pores of which are filled with and the surface of which is coated with fused particles of polytetrafluoroethylene. In another of its embodiments this invention is concerned with an insulated electrical conductor comprising an electrical conductor bearing a porous layer of electrophoretically deposited, refractory ceramic particles, the pores of which are at least partially impregnated with an inorganic, hydrated oxide gel formed in situ, and the surface of which is provided with a coating of fused polytetrafluoroethylene. The invention is also concerned with the various processes for producing the electrical conductors of the invention. According to one of the specific embodiments of the invention there is utilized a process for insulating electrical conductors, which consists of electrophoretically depositing a porous layer of refractory ceramic particles on a conductor, filling the pores of said layer with an inorganic hydrated oxide gel formed in situ, coating the surface of said layer with particles of polytetra fluoroethylene, and then fusing the particles of said polytetrafluorethylene together.

My invention is based upon the joint utilization of two different types of high temperature resistant, insulation materials, each of which alone possess disadvantages sufficient to offset its high temperature stability. Refractory ceramic particles may be coated on conductors by electrophoretic and other means to produce insulation that is extremely stable to high temperatures. However, such insulation is extremely fragile and very pervious to moisture. The best methods of treatment and processing of such layers previously suggested, in order to overcome these defects, still leave much to be desired. They tend greatly to reduce the heat stability of the insulation and fail to produce both the desired degree of abrasion resistance and imperviousness to moisture.

Polytetrafluoroethylene and copolymers of tetrafluoroethylene with other vinyl compounds are very stable at elevated temperatures, at least at temperatures below the transition point of the resin. However, at room temperature and particularly at elevated temperatures, they exhibit the characteristics of thermoplastic resins, in that they are subject to flow even below the softening or transition temperature itself, when subjected to pressure. For example, if two copper conductors are each provided with a layer of polytetrafluoroethylene and crossed under pressure, as will, for example, occur in an electrical transformer, the insulation will flow so that ultimately the two copper conductors will contact each other at the point of maximum pressure, causing a short circuit. This flow, is, of course, most pronounced at elevated temperatures, say in the neighborhood of 200° C. Polytetrafluoroethylene also possesses the disadvantage of poor adherence to the metal conductor and for this reason is not useful where a strongly adherent insulation is desired, as in conductors which are to be subjected to considerable flexing. While the polytetrafluoroethylene is more or less elastomeric and waxy in feel, it is relatively soft and does not stand up at all well in abrasion tests. Consequently, it cannot be applied to conductors which are to be subjected to considerable abrasion in processing or in use.

According to the present invention, these disadvantages of the two types of high temperature resistant, insulating materials discussed above are substantially completely eliminated by a proper combination and utilization of both. I have found that, if a thin refractory ceramic layer is bonded to the conductor and a thin polytetrafluoroethylene layer is then bonded to the refractory ceramic coating, a flexible high temperature- and abrasion-resistant, insulated electrical conductor results. If the top coating and/or the surface of the insulation predominates in or consists wholly of the resinous materials, the abrasion resistance is greatly increased over the value obtainable with an equivalent total thickness of either the resin or the ceramic material alone. While the reason for this characteristic is not fully known to me, it appears that it is due to the double bonding process just mentioned, in which the effect of the bond between the conductor and the ceramic and the bond between the ceramic and the resin leads to an abrasion resistance far in excess to that obtained without the aggregate bonded layers and materials.

There are several satisfactory methods of applying my invention in the insulation of electrical conductors. According to the preferred embodiment of the invention the refractory ceramic layer is produced by electrophoretically depositing ceramic particles on the conductor and then treating the deposited ceramic layer so that it is firmly bonded to the underlying conductor. This may be achieved by co-depositing with the ceramic material a colloidal hydrated gel, such as polymers of silicic acid. This gel is formed and deposited by an electrolytic process which occurs simultaneously with the electrophoretic process that results in the deposition of the ceramic particles. A heat treatment of the so deposited layer then gives a firm bonding between the ceramic layer and the conductor.

The nature of the electrophoretically deposited ceramic layer offers many advantages, particularly in the practice of the present invention, although the reason therefor is not completely clear to me. Other types of ceramic coatings have proved to be less satisfactory, and it seems likely that the nature of the deposited layer contributes to the improved results described herein. The electrophoretically deposited layer is, of course, somewhat porous in nature. It is very desirable that the pores of the layer be substantially completely impregnated. This I may accomplish by impregnation with particles of the resin from a suspension thereof using either a dip process or an electrophoretic process. The size of the individual resin particles should be smaller than the pore size of the ceramic layer. According to the preferred embodiment of the invention the pores of the ceramic layer may be filled in part, before treatment with the resin, with a gel-like decomposition product of an aqueous solution of a decomposable metal salt, such as aluminum nitrate. This pore-filling material appears to be a hydrated form of the metal oxide. It is formed in situ by impregnating the ceramic layer with the metal salt solution and then heating under controlled conditions. I refer to it hereinafter as a hydrated oxide gel. It is stable at the temperatures to which the conductor is subsequently subjected in processing and use.

The treatment of the conductor with the tetrafluoroethylene polymers and copolymers is preferably conducted with a suspension of particles of the partially or substantially completely polymerized material in a medium such as water, dioxane, benzene or the like. The suspending medium is chosen for its ability to maintain a uniform suspension, as well as for its properties and characteristics during the treatment of the conductor in processing. For example, water is an ideal suspension agent, since the resin particles suspend quite well therein, water being very polar in nature, and since it possesses a fairly high resistivity for the electrophoretic impregnation of ceramic pores with resin particles, in case this process is employed.

Thus, according to my invention the resin particles are applied to the ceramic layer from a suspension thereof. Impregnation of the pores of the ceramic layer, if it is still porous, may be achieved by dipping or by electrophoretic deposition of the resin particles. Additional top coatings may be applied by dipping. If the initial ceramic layer, after its own processing, is non-porous, it is not possible to use an electrophoretic process for the top coating. Several coats of resin may be applied if necessary or desired. Following each treatment of the conductor with the resin suspension, the insulation and conductor are subjected to temperatures above the transition point of the resin, in order that the particles thereof may be fused together and to the ceramic base. This fusion in the case of polytetrafluoroethylene takes place at a temperature of about 330° C. or higher. In practice 400° C. is a highly satisfactory fusion temperature. The time required for fusion at such elevated temperature is not great, particularly when the total insulation thickness is less than 1 mil.

The following examples are representative of the methods employed for producing the improved electrical conductors of the invention.

*Example 1*

28 B. & S. gauge copper wire was coated with a ceramic layer by electrophoretic means. The suspension of refractory particles consisted of:

5.0% of a 40% solution of sodium silicate
3.8% talc
3.8% china clay
3.8% zinc oxide
83.0% distilled water 0.6% "Darvan," fatty acid type of wetting agent, and possessed a resistivity of about 125 ohms per cm.³. The coating cathode was a copper cylinder ½ inch long and one inch in diameter (inside). The wire traveled at a rate of 18 feet per minute and a current flow of 15 milliamperes was maintained between the cathode and the copper wire, which served as an anode. The coated wire was passed through a heated oven whereby the water was removed from the deposited layer. The wire was then passed through another oven, held at about 445° C. to bond the refractory particles to the wire.

*Example 2*

The wire insulated as in Example 1 was dipped in a solution of 60 gms. of aluminum nitrate

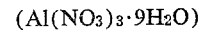

$$(Al(NO_3)_3 \cdot 9H_2O)$$

per 100 cc. of water, the solution thoroughly impregnating the pores of the ceramic layer. The conductor was then passed rapidly through a series of three ovens, in which the temperature was increased in stages from 200° C. to about 580° C. The aluminum nitrate solution was decomposed to what I assume to be a hydrated aluminum oxide state, this hydrated oxide gel partially filling the pores of the refractory coating.

*Example 3*

Wire produced as described in Example 2 was dipped in a water suspension of particles of polytetrafluoroethylene (50% solids). The particles impregnated the remaining pores of the ceramic layer and also coated the surface to some extent. The dipped wire was then passed through an oven to remove the residual water and to fuse adjacent particles of resin together. For this purpose the temperature of the wire was brought up to about 400° C. The wire was not maintained at this temperature for any appreciable length of time, e. g., the wire traveled at 18 feet per minute through an oven in which the hot spot temperature was maintained over a section not greater than about one foot in length. Following this step, the conductor was again dipped in the suspension and again subjected to the heat treatment.

*Example 4*

The procedure of Example 3 was followed with the exception that the remaining pores of the refractory layer were electrophoretically impregnated with the resin particles. The suspension of polytetrafluoroethylene particles in water possessed a resistivity of about 155 ohms per $cm.^3$ (50% solids content). The coating cathode consisted of a copper cylinder 1½ inches long with an inside diameter of about 1½ inches. The current was held at 33 milliamperes with the wire traveling at 18 feet per minute. After the electrophoretic impregnation, the conductor was heat treated as in Example 3.

*Example 5*

The procedure of Example 3 was followed with the exception that the aluminum nitrate treatment of the wire (described in Example 2) was omitted. Thus substantially all of the pores of the initial ceramic layer were impregnated with resin particles.

*Example 6*

A mixture of 75% of the ceramic suspension described in Example 1 and 25% of the polytetrafluoroethylene suspension described in Examples 3 and 4 was prepared, giving a composite suspension with a resistivity of about 140 ohms/$cm.^3$. This suspension was used in an electrophoretic deposition process on #28B. & S. gauge wire, utilizing a coating cathode 1½ inches in length and 1½ inches in diameter. The speed of the wire was 18 feet per minute, and a current of 80 milliamperes was maintained. The wire was passed through an oven (as described in Example 3) to remove residual water and to fuse the resin particles to each other and to the ceramic particles.

*Example 7*

28 B. & S. gauge copper wire was passed through the 50% solids suspension of polytetrafluoroethylene particles (described in Examples 3 and 4) and heat treated at 400° C. to fuse the particles together. A second, identical dip and heat treatment was then made, giving a total of two coats of resin.

The various insulated wires produced according to the foregoing examples were tested and their characteristics compared. It was determined that the ceramic base insulation itself (with and without the aluminum nitrate treatment) as produced in Examples 1 and 2, is characterized by a high resistance to thermoplastic flow and appreciable adherence to the underlying conductor. However, the resistance to abrasion and the toughness are low, thus eliminating its usefulness in many types of assemblies where any handling is encountered in processing or in use. On the other hand, conductors coated with the resin alone, as in Example 7, are of little practical value, because of their poor resistance to abrasion, adherence, and poor resistance to thermoplastic flow. Although the toughness and flexibility of the polytetrafluoroethylene is excellent, these other characteristics make its use unsatisfactory for most applications.

The insulations produced according to Examples 3, 4 and 5 represent a tremendous improvement over those discussed in the preceding paragraph. Their toughness and flexibility are outstanding, as is their resistance to thermoplastic flow. Their adherence to the wire is somewhat better and, of great importance, the abrasion resistance has been tremendously improved over the other types of high temperature insulation. The conductors of Examples 3, 4 and 5 may be used in many applications wherein previously known insulation was unsatisfactory. The materials may not only be handled, but will also stand up under all types of operating conditions, the insulation being impervious to moisture. Damage to any one spot in the insulation will not cause failure of adjoining sections thereof, due to lack of adherence of the insulation to the conductor.

The conductors insulated as in Example 6 likewise exhibit very desirable properties, particularly an outstanding adherence between the coating and the wire or conductor base. The insulation is not quite as resistant to thermoplastic flow as are the insulations of Examples 3, 4 and 5, but it can be improved in this respect by increasing the proportion of ceramic particles to resin in the coating.

Figures 2, 3, 4:
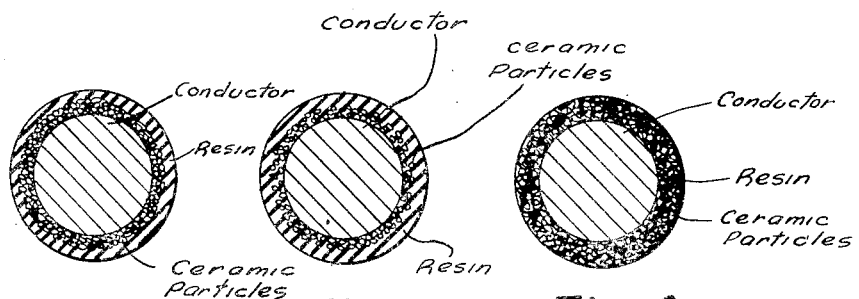
Figure 5:
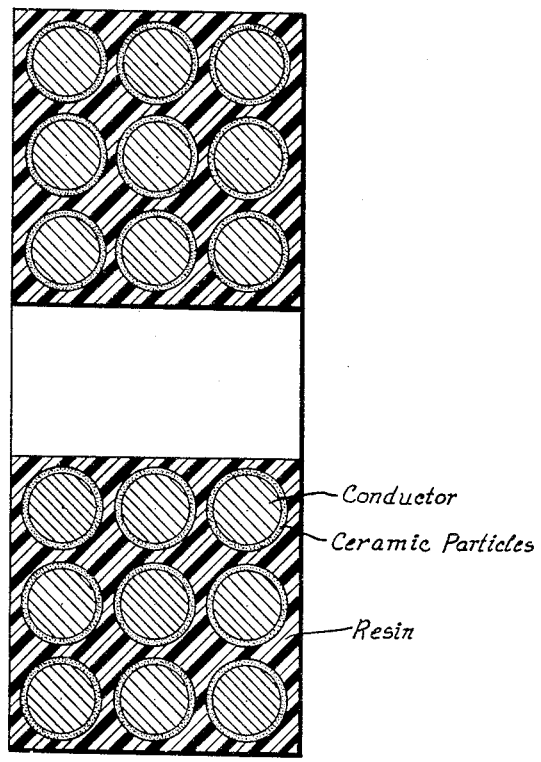

The invention will be discussed further with reference to the appended drawing in which:

Figure 1 illustrates schematically the wire coating assembly and process,

Figures 2, 3, and 4 represent cross sections of three types of insulated wire produced in accordance with the invention; and Fig. 5 is a sectional view of a unitary coil made from one of the above wires.

Referring more specifically in Figure 1, the apparatus shown is flexible in nature in that all types of wire insulation discussed in the preceding examples may be produced therein. When some of the processes of the invention are followed, utilization of all the elements of the apparatus shown in Figure 1, will not be necessary.

10 represents the supply spool of the wire 11. The wire passes over pulley 17 into cell 12 which contains a suspension 15 of refractory ceramic particles. It then passes under pulley 13, reverses its direction, and runs through the coating cathode 14 which is immersed in the suspension 15. The wire then passes through oven units 16 and 17 which remove the residual water from the deposited insulation and bond the particles of ceramic to each other and to the underlying conductor base. Wire 11 then passes over pulleys 18 and 19 and thence into tank 20 which contains a solution 21 of a metal salt which will decompose upon heating to form an inorganic hydrated oxide gel. In the tank the direction of the wire is reversed on pulley 22, and the wire then passes through ovens 23, 24 and 25 which have progressively higher temperatures. These ovens serve to remove water or other solvent and to form the inorganic hydrated oxide gel which definitely enhances the characteristics of the ceramic layer (cf. Example 2).

The wire then passes over the pulleys 26 into cell 27 which contains a suspension 28 of polytetrafluoroethylene resin particles. This cell is also provided with a coating cathode 29 which may be used for electrophoretic deposition of the resin particles, if so desired. The direction of the wire is reversed in the cell 27 by means of pulley 30. Upon leaving this cell the wire passes through oven 31 which is heated to a temperature sufficient to cause removal of the suspending medium and fusion of the resin particles.

The wire then passes over the pulleys 32 into tank 33 which also contains a suspension 34 of polytetrafluoroethylene particles. This tank is used to give a second coating of resin to the insulated conductor. Since the conductor is substantially completely insulated and impervious to moisture and electrolytes after leaving oven 31, it is not possible to employ cataphoretic deposition of the resin particles in tank 33. The resin particles are fused in oven 36, as before in oven 31, and then the wire passes over pulley 37 to the drive spool 38. Of course, it is possible to add more tanks of the type indicated in 33 to provide additional coatings of the resin material. However, unless exceptionally high voltages are to be encountered, it is not necessary to employ more than two coatings with resin particles.

In order to effect the electrophoretic deposition of the ceramic particles in cell 12 and, if so desired, resin particles in cell 27, it is necessary to provide an appropriate circuit. This is done by connecting the wire 11 as an anode to a battery or power supply 39 and 44 by means of a brush 40 on feed spool 10 or elsewhere in the apparatus. Variable resistor 41 serves to control the current flow and, of course, the unit density between conductor 11 and cathode 14 in cell 12. The cathode is connected through the ammeter 42 to a power source 39. In like manner, coating cathode 29 in cell 27 is connected through ammeter 43 to a power supply 44. The current flow in this cell is controlled by means of variable resistor 45.

If the ceramic coated conductor produced in cell 12 is not to be treated with a heat decomposable metal salt in tank 20, wire 11 will pass directly from the pulleys 18 and 19 to the pulleys 26.

Similarly, if electrophoretic treatment of the ceramic base insulation with resin particles is not to be used, the cathode 29 in cell 27 and its electrical connections may be dispensed with.

Figure 2 shows a cross section of a conductor insulated as described in Example 3. The resin provides a top coating for the ceramic particles and to some extent impregnates the pores of the ceramic coating. The inner insulation consists of a relatively high percentage of ceramic material and a relatively low percentage of resin.

Figure 3 shows a cross section of a conductor insulated as described in Example 5. In this case the pores of the ceramic layer are impregnated with the resin, which also provides a continuous top coating. Thus, the inner insulation will contain a relatively high percentage of resin although this will be less than 30% by volume.

Figure 4 shows a cross section of a conductor insulated as described in Example 6. In this case the insulation on the conductor consists of a uniform mixture of ceramic particles and resin particles, which are bonded together and to the conductor base. The proportion is uniform throughout the cross section.

Electrical conductors and semi-conductors suitable for treatment in the foregoing manner are, for example, copper, nickel plated copper, nickel, nickel-chromium alloys, beryllium-copper alloys, iron-chromium alloys, tantalum-iron-chromium alloys, and the like. In fact, any type of electrically conducting or semi-conducting wire, foil, plate or bar may be treated in accordance herewith. The conductor may be circular in cross section or may be of any other geometrical cross section. It may vary from strands of extremely small diameter and thin foils to wires, rods, bars or plates of very large size.

Refractory materials which may be deposited on the foregoing conductors are extremely varied; they comprise ceramic and vitreous materials generally. A few of the many materials falling within these categories are glass, porcelain enamel, aluminum oxide, vanadium oxide, manganese dioxide, nickel oxide, zinc oxide, molybdenum oxide, tungsten oxide, lead oxide, chromium oxide, bentonite, china clay, magnesium silicate, aluminum silicate, silicates and insoluble borates of the materials previously referred to as metal oxides, insoluble titanates, tungstates, molybdates, ground mica and related crystalline materials, titanium dioxides, etc. China clay, talc and zinc oxide are particularly desirable, when the ceramic material is to possess a relatively low dielectric constant. Titanium dioxide, barium, strontium and other metal titanates and related high dielectric constant materials are very useful, when high capacity insulation is desired. For example, in the insulation of foils and wires which are to be utilized for capacity effects, titanium dioxide may be used with outstanding results.

These refractory materials may be used alone or in conjunction with one another. Before use they should advisably be ground to small particle size suitable for suspension in a liquid medium in an electrophoretic cell. For this purpose ball-milling to a size of approximately 0.5 to 10.0 microns has been found to be quite satisfactory. Particle sizes less than 4.0 microns are preferred as a general rule. In order further to facilitate suspension of the refractory particles in the liquid medium, there may be added thereto assistants such as surface active agents and/or peptizing agents. Among these may be mentioned sulfonated higher fatty acid amides; soluble salts of sulfuric acid esters of higher fatty alcohols; soluble salts of tannic acid; polyvinyl alcohols and the like; cellulose derivatives such as carboxy methyl cellulose, methyl cellulose and hydroxy ethyl cellulose, etc.

Before use, it is advisable to remove all foreign water-soluble materials from the refractory particles. These undesirable constituents may be removed by washing the refractory particles in distilled water or in any other suitable manner.

In accordance with one of the preferred embodiments of the invention, there is incorporated in the suspension of refractory ceramic particles a soluble silicate. This material greatly facilitates the suspension of the insoluble particles and, during the electrophoretic process, appears to be electrolysed to form a colloidal polysilicic acid which deposits simultaneously with the refractory particles upon the conductor. This co-deposit leads, after heat treatment, to improved dense and adherent ceramic layers. Potassium silicate, sodium silicate and the like are suitable soluble silicates and preferably have a high silica to alkali metal ratio.

One of the preferred embodiments of the invention includes impregnation of the pores of the ceramic layer with an inorganic hydrated oxide gel formed in situ, which strengthens the ceramic insulation and increases its adherence to the underlying conductor. This inorganic hydrated oxide gel is produced by impregnating pores of the ceramic layer with an aqueous solution of a metal salt which will decompose upon controlled heating to give the hydrated oxide binder. A preferred compound for this treatment is aluminum nitrate which can be decomposed to aluminum oxide in a hydrated form by heating for short periods of time at temperatures from about 200° C. to about 500° C. If these temperatures are appreciably exceeded, or if the time of exposure to the temperatures is too great, a dehydrated aluminum oxide will be produced. The latter does not contribute to the improvement of the characteristics of the ceramic insulating layer. Following formation of the inorganic hydrated oxide gel, the ceramic insulation is fairly tough, but is still porous to some extent. Other decomposable metal salts have been found satisfactory for the same purpose. Among these are the nitrates of iron, chromium, titanium, bismuth, cadmium, lead, lithium, manganese, magnesium, tin, copper, lead, uranium, thorium, strontium and zinc. Further, salts other than the nitrate may be used, as, for example, ammonium aluminum sulfate and aluminum oxalate. Proper decomposition conditions for the individual salts must be used to obtain the optimum bonding effect of each.

The resin particles used consist of polymers or copolymers of tetrafluoroethylene. The particle size of the resin is generally less than 10 microns and is preferably in the neighborhood of 0.5 micron. The preferred resin for use in accordance with the invention is polytetrafluoroethylene, which has extremely high softening and decomposition temperatures, as well as unusual solvent resistance.

Copolymers of tetrafluoroethylene with other polymerizable substances, particularly those containing a —C═C— group, are also suitable for use according to the invention. Among the copolymerization materials that may be employed are ethylene, vinyl fluoride, and other fluoroethylenes, as well as chlorofluoroethylenes. The tetrafluoroethylene should preferably predominate in the polymerization mixture.

The suspension of the resin particles may be prepared with the assistance of a dispersing agent. The suspending medium is advisably polar in nature and, for this purpose, water is ideal. Under suitable conditions, it is possible to conduct the polymerization and formation of the suspension in a single operation by polymerizing the tetrafluoroethylene in the suspending medium. For use in the process described herein, the resin may be partially or completely polymerized. According to the preferred embodiment of the invention, polymerization is substantially complete, before the resin is applied to the conductor.

Wound coils, transformers and the like utilizing the insulated wires of the invention may be subjected to impregnation and/or heat treatment. Impregnation with a suspension of polytetrafluoroethylene resin particles and, for that matter, of other resin materials to produce substantially solid units without voids may be accomplished. If so desired, coils may be heated to a temperature of 330° C. or more to fuse adjacent resin surfaces, thereby effectively producing a rigid, unitary assembly which, although there are voids, will not transmit moisture or permit movement of individual conductors. Fig. 5 shows such a coil.

The insulation of the invention is also particularly useful for electrical condensers, wherein it replaces the paper, mica or other dielectric material conventionally employed. Insulated foil electrodes may be produced by the same methods heretofore described for insulating wires. The foil simply replaces the wire in these processes. After the insulation has been applied, a condenser may be prepared by stacking or rolling two electrode foils, at least one of which is insulated in accordance with the invention. A condenser of this type may be operated at temperatures up to about 325° C.

If it is desired to produce the flexible insulation without a conductor base, it is possible to deposit and form the insulation on a stainless steel ribbon or drum (to which the adherence of the ceramic is not too great) and subsequently to strip it off with a doctor blade or by other known means. Because of the adherence of the insulation to the conducting base, this procedure must be carefully controlled and a sharp blade employed, at least to start the stripping.

The insulation of the invention is particularly valuable for high temperature applications, since it is substantially non-inflammable and does not flash at any temperature below 400° C. at a minimum. The insulated conductors of the invention are useful in many devices where their unusual properties are of advantage.

1. *Coils.*—Transformer, relay, choke and other windings may employ the insulated conductors of the invention, permitting higher, safe operating temperatures and therefore higher electrical efficiencies, since the volume can be reduced over conventional coils, for any given current rating. Electrical motors of all types can be made more efficient from weight and volume standpoints, since the conductors in the windings can operate at higher temperatures than with conventional enamel insulation, thus carrying more current. The flame-proof nature of the insulation, the resistance to thermoplastic flow, the resistance to moisture and corrosive atmospheres, the resistance to grease, oil and other solvents, and other characteristics of the insulated conductors of the invention are particularly valuable for such purposes as those mentioned above.

2. *Resistance devices.*—Precision wire wound resistors, low temperature heating elements, such as electric blankets and the like, and other devices requiring insulated resistance wire may utilize the insulated nichrome conductors of the invention. Fine resistance wire is particularly sensitive to corrosive atmospheres. The insulation of such wire in accordance with the invention removes the possibility of damage or failure of the wire due to corrosion.

3. *Wiring.*—The insulated conductors of the invention are of value in applications where temperature-, flame-, moisture-, solvent-, and flow-resistant insulated conductors are required for wiring and connection purposes. Among these applications are radio circuits, transmission and power line circuits, welding circuits, jet and turbine motor control circuits, thermocouple wiring, relay and circuit-breaker circuits, sensitive bridge circuits, oscillator and frequency-standard circuits, automobile ignition circuits, and other devices.

4. *Capacity devices.*—In many applications of insulated conductors, the dielectric properties of the insulation are very important. For many high frequency circuits, it is desirable that the dielectric constant be very low and that the "Q" or approximate reciprocal of the power factor be very high. Since the polytetrafluoroethylene resin constituent has these properties, and since it is possible to deposit any desired ceramic materials (as, for example, high "Q" glass, ground mica etc.), it is possible to produce insulated conductors ideal for this purpose.

Further, coaxial and twin conductors, such as low and high impedance cable and television antenna lead in wires, may be produced in accordance with the invention. Coaxial conductors may be produced by depositing or extruding a metal sheath on the insulation. Twin and parallel conductors can be produced by running the insulation process on two parallel conductors, instead of on a single strand wire, bar, sheet or rod. The thickness of insulation required will depend in part upon the spacing between and diameter of the individual conductors.

In applications wherein a high electrical capacity between the inner conductor and an outer conductor is desired, the ceramic material used should possess a high dielectric constant and be as thin as is consistent with voltage considerations to be met. Likewise the resin content may be reduced to the minimum amount necessary to attain the required physical characteristics.

While my invention is particularly useful for electrical applications it may also be employed in other arts. The ceramic layer acts as an anchor for the polytetrafluoroethylene resin, thus making such combined coatings useful for a variety of purposes in which they are subjected to flexing, shock, abrasion and the like. The coatings need not necessarily serve for electrical insulation, but may be used to protect the conductor against corrosion, wear, or the like. As previously pointed out, the base must be a conductor or a semi-conductor, in order to permit electrophoretic deposition of the ceramic and, if desired, resin particles. A non-conducting base may be employed provided it is coated or otherwise treated to render it superficially conductive. It can be seen that my invention broadly includes not only the insulated conductors themselves, but also the numerous devices which can be improved or even made successfully the first time by the novel insulated conductors and insulating processes of the invention.

As many apparently widely different embodiments of this invention may be made without departing from the spirit and scope hereof, it is to be understood that the invention is not limited to the specific embodiments hereof except as defined in the appended claims.

I claim:

1. A flexible electrical conductor having a coating of both electrophoretically applied refractory particles and fused particles of a resin of the group consisting of polymers and copolymers of tetrafluoroethylene.

2. A process for coating a flexible electrical conductor, which process comprises electrophoretically applying to said conductor a coating of refractory particles and of particles of a resin of the group consisting of polymers and copolymers of tetrafluoroethylene, and then fusing said resin particles together.

3. An electrically conductive wire insulated with a coating of heat-treated refractory particles and fused particles of polytetrafluoroethylene, said particles being not more than about 10 microns in size and the refractory particles having been electrophoretically deposited simultaneously with the anodic deposition product of a water solution of a silicate and the entire coating being about 1 mil thick.

4. An electrical conductor wire having a heat-treated porous coating of particles of water-insoluble refractory insulating material electrophoretically deposited simultaneously with the anodic electrolytic deposition products of a soluble silicate, the pores of said coating being impregnated with hydrated aluminum oxide formed in situ, said coating being covered with a layer of fused particles of polytetrafluoroethylene.

5. A flexible electrical conductor having an external surface coated with a heat treated electrophoretically deposited layer of particles of refractory ceramic material mixed with simultaneously applied anodic deposition products of a water-soluble silicate, the pores of said layer being impregnated with a heat-stable, inorganic, hydrated oxide gel formed in situ, said layer being covered with a top coating of fused particles of a resin of the group consisting of polymers and copolymers of tetra-fluoroethylene.

6. A flexible electrical conductor having an external surface coated with a porous heat-treated electro-phoretically deposited layer of particles of refractory ceramic material mixed with the simultaneously applied anodic deposition product of a water-soluble silicate, the pores of said layer being impregnated with fused particles of a resin of the group consisting of polymers and copolymers of tetrafluoroethylene.

7. The combination as defined by claim 1 in which the refractory particles and the resin particles are simultaneously deposited as a mixture.

8. The combination as defined by claim 3 in which the refractory particles and the resin particles are simultaneously deposited as a mixture.

9. The combination as defined by claim 4 in which the conductive wire is a copper wire.

10. The combination as defined by claim 4 in which the conductor wire is a nickel-chromium alloy.

11. A process for coating a flexible wire, which process comprises electrophoretically depositing on said wire a mixture of refractory particles, polytetrafluoroethylene particles and the anodic deposition product of a water solution of a silicate, said particles being less than about 10 microns in size, and then heating the deposit to fuse the polytetrafluoroethylene particles together and to the refractory particles.

12. In a process for depositing a resin binder on a conductor electrophoretically coated with ceramic particles, the step of electrophoretically depositing on the ceramic-coated conductor particles of a resin selected from the class consisting of polymers and copolymers of tetrafluoroethylene, and then heating the resulting coated conductor to fuse the resin particles together.

13. An electrical conductor provided with an insulating ceramic coating therearound and a superposed sheath coating of a polymeric material selected from the group consisting of polytetrafluoroethylene and copolymers of tetrafluoroethylene and another polymerizable organic compound containing an ethylenic double bond.

14. The insulated electrical conductor of claim 13 in which the polymeric material is polytetrafluoroethylene.

15. The insulated electrical conductor of claim 13 in which the sheath coating is at least .0003 inch thick.

16. An electrical conductor provided with an insulating ceramic coating therearound and a superposed sheath coating of a copolymer of tetrafluoroethylene and another polymerizable organic compound containing an ethylenic double bond.

17. In the process of producing an insulated electrical conductor, the improvement which comprises coating a ceramic covered conductor with a coating composition comprising a suspensoid of a polymeric material selected from the group consisting of polytetrafluoroethylene and copolymers of tetrafluoroethylene and another polymerizable organic compound containing an ethylenic double bond, said copolymers being dispersed in an organic medium, heating to adhere the coating particles to the ceramic coating and to themselves, and cooling to room temperature.

18. The process of claim 17 in which the coating, after coalescing is at least .0003 inch thick.

19. The process of claim 17 in which the polymeric material is polytetrafluoroethylene.

20. In the process of producing an insulated electrical conductor, the improvement which comprises coating a ceramic covered conductor with an aqueous suspension of polytetrafluoroethylene, heating to adhere the polytetrafluoroethylene particles to the ceramic coating and to themselves, and cooling to room temperature.

21. The process of claim 20 in which the coating is heated at a temperature of at least 621° F.

22. In the process of producing an insulated electrical conductor, the improvement which comprises coating a ceramic covered conductor with a suspensoid of a copolymer of tetrafluoroethylene and another polymerizable organic compound containing an ethylenic double bond, said copolymer being dispersed in an organic medium, heating to adhere the copolymer particles to the ceramic coating and to themselves, and cooling to room temperature.

23. In the process of producing an insulated electrical conductor, the improvement which comprises coating a ceramic covered conductor with an aqueous suspension of polytetrafluoroethylene containing a hydrated oxide of an element selected from groups III and IV of the periodic table, heating to adhere the polytetrafluoroethylene particles to the ceramic coating and to themselves, and cooling to room temperature.

24. In the process of producing an insulated electrical conductor, the improvement which comprises coating an electrical conductor with an aqueous suspension mixture of a ceramic material and polytetrafluoroethylene, heating to coalesce the suspension particles, cooling, applying thereover a coating composition comprising a suspensoid of a polymeric material selected from the group consisting of polytetrafluoroethylene and copolymers of tetrafluoroethylene and another polymerizable organic compound containing an ethylenic double bond, said copolymers being dispersed in an organic medium, heating to adhere the coating particles to the first coating and to themselves, and cooling to room temperature.

25. The process of claim 20 in which the aqueous suspension has a solids constant of approximately 50%.

26. A coil having a plurality of turns of an electrical conductor provided with an insulating ceramic coating therearound and a superposed sheath coating of polytetrafluoroethylene, the polytetrafluoroethylene sheath on the adjacent turns of the winding being fused together to hold the turns in a rigid unitary assembly.

27. The coil of claim 26 in which there are substantially no voids in the assembly.

28. The insulated electrical conductor of claim 16 in which the copolymer is one of tetrafluoroethylene with ethylene, and in which the tetrafluoroethylene predominates in the polymerization mixture.

29. The process of claim 22 in which the copolymer consists essentially of tetrafluoroethylene and ethylene, and in which the tetrafluoroethylene predominates in the polymerization mixture.

References Cited in the file of this patent

UNITED STATES PATENTS

| Number | Name | Date |
| --- | --- | --- |
| 2,307,018 | Cardell | Jan. 5, 1943 |
| 2,386,634 | Robinson | Oct. 9, 1945 |
| 2,392,378 | Hanford | Jan. 8, 1946 |
| 2,393,068 | Ruben | Jan. 15, 1946 |
| 2,412,960 | Berry | Dec. 24, 1946 |
| 2,421,652 | Robinson et al. | June 3, 1947 |
| 2,478,322 | Robinson et al. | Aug. 9, 1949 |
| 2,495,630 | Dorst | Jan. 24, 1950 |